Nov. 12, 1940.  F. J. MAYWALD, JR  2,220,938
BEADING MECHANISM
Filed Jan. 5, 1939  3 Sheets-Sheet 1
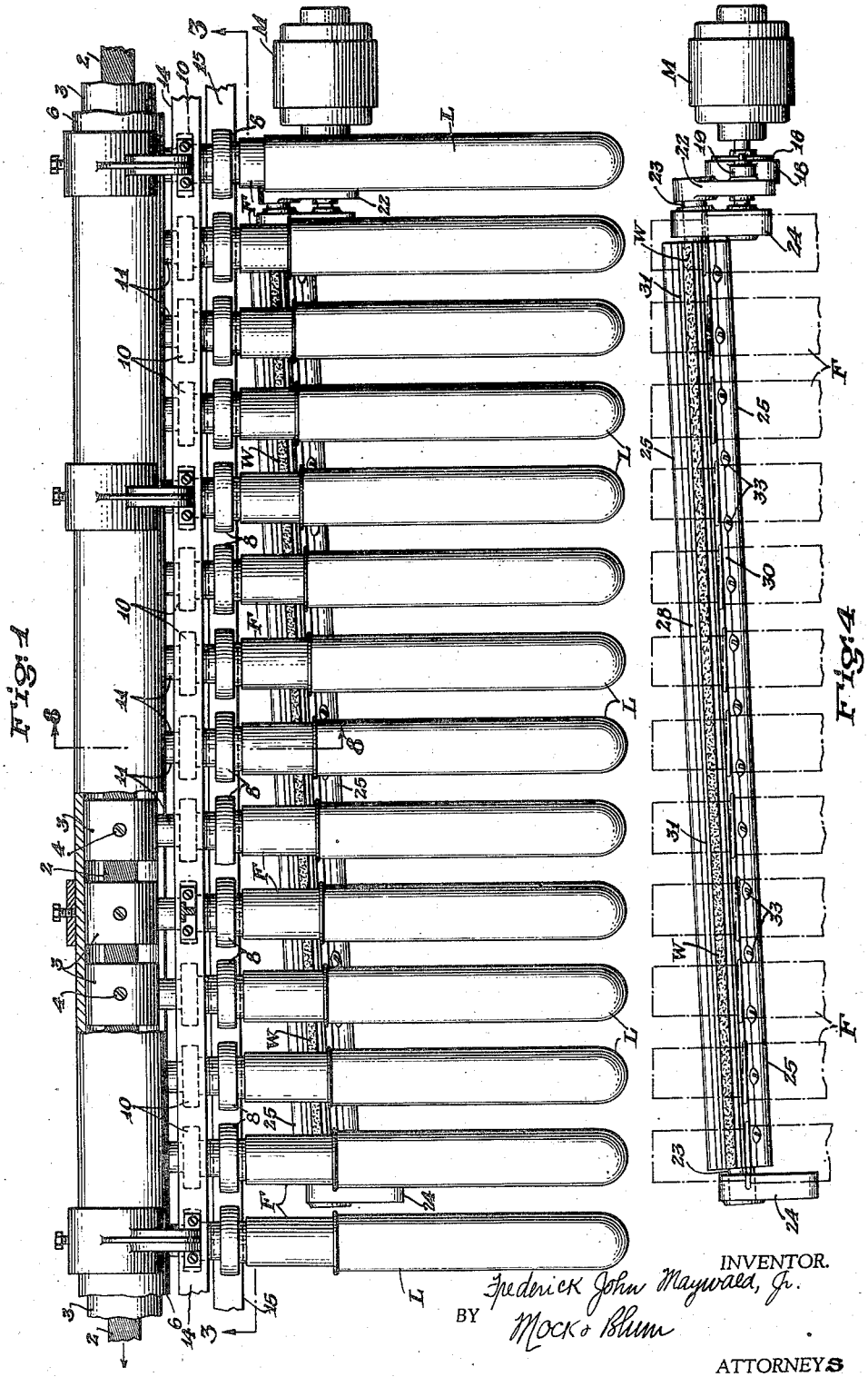
INVENTOR.
Frederick John Maywald, Jr.
BY Mock & Blum
ATTORNEYS

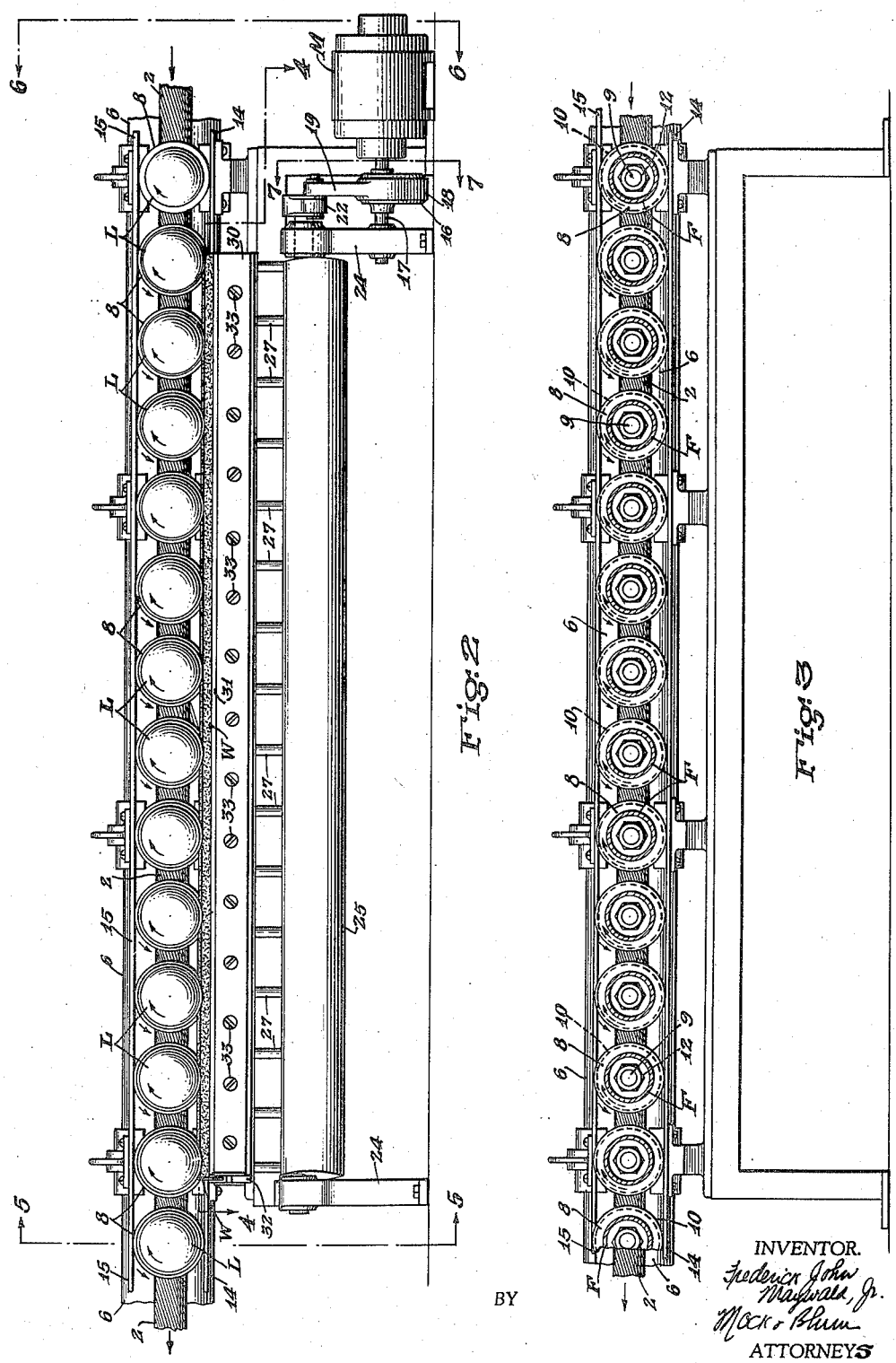

Nov. 12, 1940.   F. J. MAYWALD, JR   2,220,938
BEADING MECHANISM
Filed Jan. 5, 1939   3 Sheets-Sheet 3
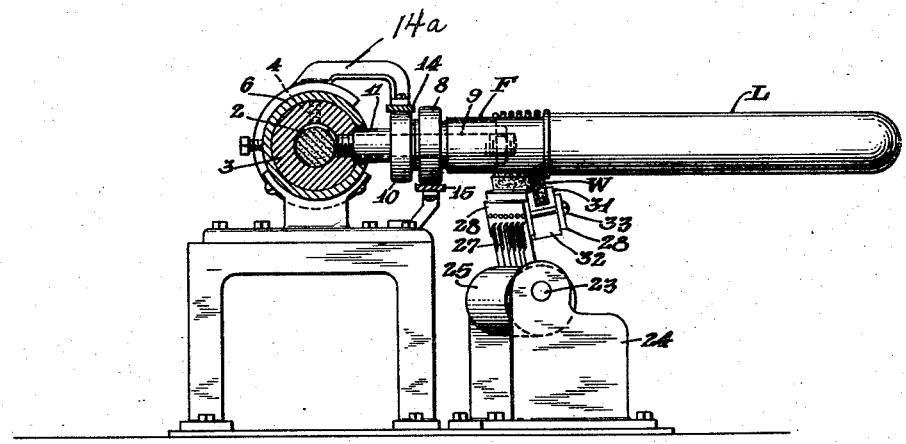
Fig. 5
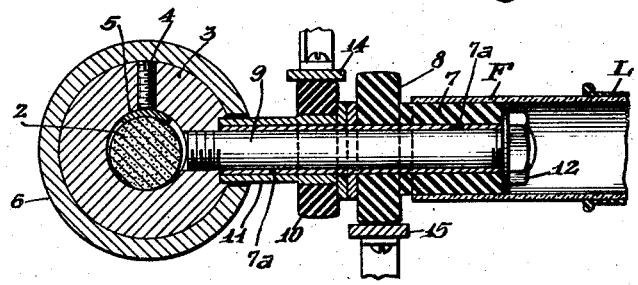
Fig. 8
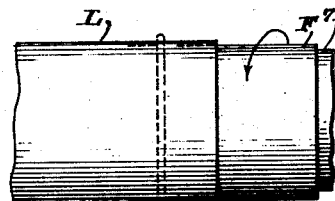
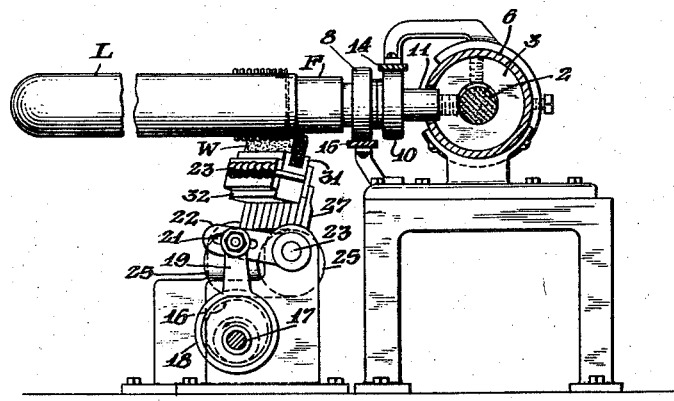
Fig. 6
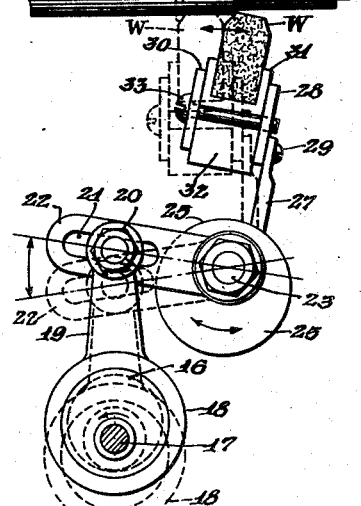
Fig. 7
INVENTOR.
Frederick John Maywald, Jr.
BY Mock & Blum
ATTORNEYS Patented Nov. 12, 1940

2,220,938

UNITED STATES PATENT OFFICE 2,220,938

BEADING MECHANISM

Frederick John Maywald, Jr., Rutherford, N. J., assignor, by mesne assignments, to Frank B. Killian & Company, Akron, Ohio, a partnership composed of James Tyrrell, trustee, Perry H. Stevens, Lucy C. Stevens, and Maurice Gusman, all of Akron, Ohio Application January 5, 1939, Serial No. 249,397

6 Claims. (Cl. 18—2)

My invention relates to improvements in a machine and method for making rubber goods, and in particular, dipped rubber goods, such as finger-cots and the like.

One of the objects of the invention is to provide a simple and reliable machine and method for said purpose.

Another object of the invention is to eliminate the use of brushes in forming the beads or reinforcing rings, and in particular, to eliminate the use of rotary brushes.

Another object of the invention is to produce wipers for forming said beads or reinforcing rings, said wipers being free from brush bristles, although the invention is not limited to any type of wiper.

Another object of the invention is to provide a machine having dipping forms which are turnable about their respective longitudinal axes, and to turn said forms around said axes by the wiping action of oscillating wipers on films of latex which are located on said forms, instead of relying wholly or partially on other means for turning said forms.

Another object of the invention is to provide a machine and method which can be operated at high speed and which will produce uniform merchandise of high quality.

Other objects of my invention will be set forth in the following description and drawings which illustrate a preferred embodiment thereof, it being understood that the above statement of the objects of my invention is intended generally to explain the same without limiting it in any manner.

Fig. 1 is a top plan view of the essential parts of the improved beading device, which may be used as an independent machine, or as part of a machine which performs additional functions.

Fig. 2 is a front elevation of the device shown in Fig. 1.

Fig. 3 is a sectional view on the line 3—3 of Fig. 1.

Fig. 4 is a sectional view on the line 4—4 of Fig. 2.

Fig. 5 is a sectional view on the line 5—5 of Fig. 2.

Fig. 6 is a sectional view on the line 6—6 of Fig. 2.

Fig. 7 is a sectional view on the line 7—7 of Fig. 2.

Fig. 8 is a sectional view on the line 8—8 of Fig. 1.

The device comprises a series of forms F, which are connected to a cable 2 by means of intermediate connecting means. The cable 2 may be of the usual endless type, and it may be guided and actuated by means of suitable pulleys. Since this invention is directed particularly to the beading means, I have not shown the entire endless cable 2, or the complete means for guiding the same. The cable 2 may be made of any suitable flexible material and it may be replaced by any endless conveyor or by any suitable type of conveyor.

As shown in Fig. 1 and Fig. 8, spaced collars 3 are clamped to the cable 2. This is done by means of clamping screws 4, whose heads are flush with the outer surfaces of the collars 3. The inner ends of the clamping screws 4 abut washers 5, which are made of metal or other suitable rigid material, so as to prevent deforming the cable 2 under the pressure of the clamping screws 4. The collars 3 are slidably guided in a rigid guide tube 6, which is made of metal or other suitable material. The collars 3 can also turn relative to said guide tube 6.

Referring particularly to Fig. 8, the dipping forms F are hollow and they are provided at their inner ends with hollow rubber inserts 7 which are preferably resilient. Metal bushings 7a are located in said inserts 7. Said bushings 7a extend through other parts of the device, as shown in Fig. 8. These rubber inserts 7 are integral with rubber rolls or wheels 8. The collars 3 are provided with tapped bores, in which the externally-threaded ends of studs 9 are inserted. These studs 9 pass through the bores of rolls or wheels 10, which are made of rubber. Metal spacers 11 maintain the rubber rolls 10 at predetermined distances from the outer wall of the tube 6. Spacing washers are located between rolls 8 and 10. The studs 9 pass through bushings 7a and said inserts 7 and bushings 7a are held connected to said studs 9 by means of nuts 12. The inserts 7 have a tight fit within the forms F, so that each insert 7 turns in unison with the respective form F, around the common longitudinal axis of said insert and of said form. The rubber roll 8 therefore turns in unison with its respective form. The rubber roll 10 can turn freely relative to the respective stud 9, so that each form F can be turned freely relative to the respective rubber roll 10. The roll 10 can turn in unison with bushing 11. The spacer bushing 11 projects through a slot which is provided in the tube 6, so that the collars and their connected parts, including the forms F, can slide freely relative to the stationary tube 6. There is a slight clearance between each spacing member 11 and the corresponding slot in the wall of the tube 6, in order to permit the members 11 to slide and to turn easily relative to the stationary tube 6.

During the beading operation, the rubber rolls 10 contact with an upper fixed rail 14, and the rubber rolls 8 contact with a lower fixed rail 15.

During the beading operation, the forms F have their longitudinal axes located accurately in the same horizontal plane, because the rubber rolls 8 then rest upon the supporting rail 15, and upper rail 14 abuts the rolls 10. Since the rubber rolls 10 can turn freely relative to the forms F, the contact between said rubber rolls 10 and the upper rail 14 does not turn the forms around their respective longitudinal axes. Before the beading operation is begun, each form F is provided with a layer L of latex or of any suitable rubber dispersion or solution. The original length and shape of this film of latex, which results from the dipping operation is shown at the right-hand side of Fig. 1. The other forms show how the bead is formed by successively wiping the open end of said film of latex, towards the closed end thereof. The left-hand form in Fig. 1 shows the final shape and length of the beaded article. The corrugations of film L in Fig. 6 merely diagrammatically show the formation of the ring or bead. Said bead has smooth uncorrugated outer and inner surfaces at all times. This bead is thicker than the rest of the rubber article.

The slot in the tube 6, which is adjacent the wipers which perform the beading operation, is horizontal, so that the respective forms can have their longitudinal axes located in the same horizontal plane, during the beading operation.

Fig. 2 shows an electric motor M whose shaft 17 is provided with an eccentric 16, which is keyed to said shaft. The usual collar 18 is mounted upon the eccentric 16, and the eccentric 16 can turn freely relative to said collar 18 in the usual manner. The collar 18 is rigid and made of any suitable metal, and it is integral with an arm 19. The members 16, 18 and 19 are also clearly shown in Fig. 7. The arm 19 is adjustably connected by means of a clamping member 20, in the slot 21 of the arm 22. The solid metal cylinder 25 is provided at its ends with eccentric pivot studs 23, which are supported turnably in bearings 24. The horizontal longitudinal axes of said studs are perpendicular to the longitudinal axes of forms F, and inclined to the longitudinal axis of cylinder 25. The arm 22 is clamped to one of said studs 23, by means of a suitable clamping nut which is shown in Fig. 7. The eccentric 16 therefore oscillates the cylinder 25. Said cylinder 25 is provided with spaced arms 27, to which a clamping member 28 is connected by means of screws or other fastening members 29. The clamping member 28 cooperates with an auxiliary clamping member 30. The clamping members 28 and 30 clamp in position an intermediate channel-shaped holder 31. A spacing block 32, which is not integral with the channel-shaped holder 31, is also located between the clamping members 28 and 30. The clamping member 30 is forced towards its clamping member 28, by means of screws 33.

A wiper W is held in the recess of the holder 31. This wiper W has the shape shown in Fig. 7. It may be made of suitable flexible or resilient material, such as the compressed felt which is used in making buffing wheels. It has enough rigidity to maintain it in the predetermined normal shape which is shown in the drawings. Said wiper W may be made of any suitable material, and the invention is not restricted to the use of any particular material. As shown in Fig. 7, said wiper W has an outer planar edge, and the side walls of said wiper are planar and inclined to said outer edge, at the tip of the wiper. The invention is not limited to this shape.

The wiper W is oscillated in an arc which is indicated by the double arrow in Fig. 7. The amplitude of said oscillation is also shown by the full lines and broken lines of Fig. 7.

As shown in Fig. 4, the longitudinal axis of the cylinder 25 is located in a horizontal plane and said horizontal plane and said longitudinal axis of the cylinder 25 is inclined to the respective horizontal axis of the forms, during the beading operation.

When the wiping action begins, as at the right-hand side of Fig. 1, the wiper W strikes the respective form inwardly of the inner end of the film of latex, and the wiper is then moved towards the outer end of the form, so that the wiper contacts with the film of latex L, during its wiping movement towards the free end of the form. The film of latex is thus wiped towards the closed outer end of the rubber film. As the forms are moved longitudinally by means of the cable 2, the zone of wiping action is advanced successively towards the tips or free ends of the forms, so as to insure proper successive beading action. The dipped film thus has its length successively decreased and the length and thickness of the bead are successively increased, until the beading operation is completed as shown at the left-hand side of Fig. 1.

In this embodiment the rolls 8 and the insert 7 are made of hard but resilient rubber, which has enough rigidity to maintain the rolls 8 and the insert 7 in the predetermined shape shown in Fig. 5. Likewise in this embodiment the rolls 8 are maintained continuously in contact with the lower rail 15 by the action of the rolls 10 and upper rail 14, during the beading operation. Said rail 14 is connected to tube 6 by arms 14a. Therefore, in this embodiment, the longitudinal movement of the cable from right to left, which is indicated by the corresponding arrows in Fig. 2, tends to cause each form to turn around its own longitudinal axis, during said continuous movement of the cable 2. The effect is to tend to cause the forms to turn counterclockwise, if the eye of the observer is located in front of the tips of the forms. During said continuous movement of the cable 2, the rolls 8 contact with the lower rail 15 so that said rolls 10 will turn in said counterclockwise direction. Since rolls 10 contact with upper rail 14, the longitudinal movement of cable 2 will cause rolls 10 to turn freely in the clockwise direction. The respective directions in which rolls 8 and 10 are turned by the longitudinal movement of cable 2 are indicated by the curved arrows in Figs. 2, 3 and 7.

It would not be departing from the invention if the rolls 8 and 10 were made of metal or other material and if said rolls 8 could turn freely relative to the forms F, like the rolls 10.

During this wiping movement, the wiper W is moved upwardly so that it abuts the form and said wiper is compressed either prior to the commencement of the wiping stroke, or after said commencement and prior to the completion of the wiping stroke. During the wiping stroke or action, the wiper is moved from the initial inclined position shown in full lines in Fig. 7, to the substantially upstanding position shown in said figure in broken lines. This wiping stroke tends to turn the forms upwardly. During the return stroke of the wiper from the broken-line position of Fig. 7 to the full-line position, the wiper moves out of contact with the forms. Hence the oscillation of the wiper W tends to cause the forms to oscillate up-and-down. The slight clearance between bushings 11 and the horizontal slot in tube 6 would permit the collars 3 and forms F to oscillate slightly relative to the straight horizontal longitudinal axis of the respective part of cable 2, which is adjacent said horizontal slot of stationary and rigid tube 6. The sole purpose of the rolls 8 and 10 is to act as abutment rolls during the wiping movement of the member W, so as to keep the axis of the forms substantially horizontal during the beading action and to prevent said forms and the collars 3 from oscillating up-and-down even slightly relative to the horizontal longitudinal axis of the adjacent portion of the cable 2.

The wiper W remains parallel at all times to the position shown in Fig. 1 and Fig. 4 because the horizontal axes of oscillation of the studs 23 are parallel to each other and said axes of studs 23 are perpendicular to the axes of the forms on whose films the beading operation is being performed. The effect of the half-oscillation of the cylinder 25, during the wiping movement, is therefore to raise the wiper W and to move it forwardly towards the tips of the forms, while maintaining the longitudinal axis of said wiper W parallel to said position shown in Fig. 1 and Fig. 4. The longitudinal axis of wiper W is at all times parallel to a predetermined horizontal line which is inclined to the axes of forms F.

When the forms are in contact with the wiper, and cable 2 is moved continuously and longitudinally, said continuous longitudinal movement of the cable tends to cause the forms to turn counterclockwise, since the wiper is at all times located below the forms.

The wiper W is oscillated at high speed, about 1800 complete oscillations per minute, although this may be regulated as desired. The angle between the longitudinal axis of the wiper and the axes of the forms during the beading operation, may be about 15°, although this can be varied. In actual practice the length of the wiper may be about 48 inches and each form is moved from one end of the wiper to the other end thereof during a period of 15 seconds, although this can be greatly varied.

The forms F are made of wood or porcelain or metal and they have highly polished surfaces.

The film of rubber L has substantial viscosity and adherence to the respective form. Due to the angle between the longitudinal axis of the wiper and the longitudinal axes of the forms, the wiping stroke tends to shear the edge of film L laterally during its wiping movement, in a direction from left-to-right, referring to Fig. 1, in addition to forcing the edge of film L towards the tip of the form. This lateral shearing action operates to turn each form counterclockwise, so that the forms would be turned suitably and sufficiently even if rolls 8 were turnable freely relative to forms F. Therefore the operation of the device does not depend on the turning of rolls 8 which may be produced by rail 15. Rolls 8 are of greater diameter than rolls 10. The wiper, in addition to being moved back-and-forth in a direction parallel to the axes of the forms, is also moved up-an-down. Hence the wiper is moved to-and-fro in a direction perpendicular to the axes of the forms, by said up-and-down movement, in addition to its back-and-forth movement in a direction parallel to the longitudinal axes of the forms. In this embodiment the wiper is in contact with the form during a major portion of its wiping stroke, and also during a major portion of the reverse stroke. It would not be departing from the invention if the wiper were moved out of contact with the form during the reverse stroke from the broken line position of Fig. 7 to the full line position thereof, or during a major part of said reverse stroke.

Tests have shown that if the wiper is moved towards the tips of the forms while said wiper is maintained parallel to its position shown in Fig. 1, and while the cable 2 is held stationary, the forms will not be rotated about their respective longitudinal axes, if there are no films of rubber on said forms. However, if said forms do have films of rubber, said movement of the wiper causes the forms to turn around their respective longitudinal axes. This proves that the lateral shearing movement of the film of latex exerts a torque on each of the forms.

After the beads have been formed, the rubber members are allowed to dry or set, and they are then stripped from the forms in any convenient manner.

While I prefer to perform the beading operation while the axes of the forms are horizontal, the invention is not restricted to this feature.

While a complete combination is shown in the preferred embodiment, said embodiment includes numerous valuable sub-combinations which need not be operative per se. Numerous changes and omissions can be made in said embodiment without departing from the spirit of the invention.

In former devices of this type which have used a continuously turning brush or rubber roll or the like, each form was maintained on continuous contact with said brush or the like, and said brush or the like had a continuous beading action. According to this invention, the material of the rubber film is moved in the same direction in a succession of intermittent wiping movements and said wiping movements also turn the form around its longitudinal axis. Even though the roll 8 (if fixed to form F) may cause the form F to turn around its longitudinal axis, this is not necessary because the lateral shearing action of the wiper is sufficient to turn the form through the necessary angle during the beading action. Likewise, when the wiper is pressed upwardly against the forms, the effect is to press the free rolls 10 against upper rail 14 and to relieve the pressure of rolls 8 against lower rail 15, either wholly or partially, and preferably wholly.

Hence, during each wiping or beading stroke, the roll 8 is substantially inoperative to turn the form F, and said form is turned by the lateral shearing action of the wiper, and by the contact of the underside of the form with the wiper, while cable 2 is continuously moved longitudinally. By making the material of roll 8 sufficiently hard, the turning action of said roll 8 is substantially nullified if the form is turned very slightly above its horizontal position. Therefore, even if roll 8 turns in unison with form F, it serves to turn the form between the beading strokes and not during the beading strokes. It is preferred to control the turning of the form during the beading strokes wholly by the action of the wiper.

The material of the wiper is preferably more easy to compress or to distort, than the material of rolls 8. Rolls 10 should be of material which is sufficiently non-compressible to prevent the forms from being raised even slightly from their horizontal position, during the beading strokes.

The lateral shearing action of the wiper is preferably insufficient to cause the rubber film to move relative to the form in a direction perpendicular to the axes of the form, although there may be such lateral movement. However, the film is urged to move in said lateral direction, so as to cause the form to turn. The form should turn very easily around its own axis, with a minimum of friction, and suitable anti-friction bearings may be used for this purpose.

The axis around which the form can turn is preferably, but not necessarily, the central longitudinal axis of said form. The invention is not restricted to continuous movement of cable 2. The rolls 8 and 10 and their reflective rails can be omitted without departing from the broader scope of the invention. The general design will then be sufficient to maintain the respective axes of the forms substantially in the same plane, during the beading operation.

I claim:

1. In a beading device, the sub-combination of a turnable form, a wiper, means adapted to move the wiper back-and-forth in contact with the form in a wiping stroke and in a reverse stroke, said wiper having a wiping edge which is inclined to the axis of the form.

2. In a beading device, the sub-combination of a turnable form, a wiper, means adapted to move said wiper back-and-forth in a direction perpendicular to the axis of rotation of said form and also in a direction parallel to the said axis of said form, means for maintaining the wiping edge of said wiper inclined to said axis of the form.

3. Beading mechanism comprising a series of forms, a movable support to which said forms are connected, said forms being respectively turnable relative to said support about a series of respective axes which are substantially parallel and located in substantially the same plane, a wiper, means adapted to maintain said wiper with its wiping edge in a direction inclined to said axes, means adapted to move said wiper to-and-fro relative to said axes in in a succession of intermittent wiping strokes.

4. Beading mechanism comprising a series of forms, a movable support to which said forms are connected, said forms being respectively turnable about a series of respective axes which are substantially parallel and located in substantially the same horizontal plane, a wiper-support mounted to oscillate about an axis of oscillation which is offset laterally from said axes and which is substantially perpendicular to said axes, a wiper connected to said wiper-support, said wiper having a wiping edge which is inclined to said axes, means adapted to oscillate said wiper-support so that said wiper is moved in a wiping stroke to contact with said forms and to wipe a film located on said forms in a predetermined direction, and said wiper is then moved back in a reverse stroke away from the edge of the film, means adapted to move said support while maintaining said axes substantially parallel to each other and in substantially the same plane.

5. A beading mechanism according to claim 4 in which the wiper is moved out of contact with said forms at the completion of said reverse stroke.

6. Beading mechanism comprising a series of forms, a wiper, a movable support to which said forms are connected, said forms being located sufficiently close to each other and said wiper being of sufficient length so that said wiper can contact with a plurality of said forms, said forms being respectively turnable relative to said support about a series of respective axes which are substantially parallel and which are located in substantially the same plane, means adapted to actuate said wiper relative to said forms in a succession of intermittent wiping strokes, said wiper having a wiping edge which is inclined to said axes.

FREDERICK JOHN MAYWALD, Jr.